United States Patent [19]
Cook

[11] 4,319,862
[45] Mar. 16, 1982

[54] BOAT TRAILER

[76] Inventor: Leslie J. Cook, 25686 Wick Rd., Taylor, Mich. 48180

[21] Appl. No.: 188,078

[22] Filed: Sep. 17, 1980

[51] Int. Cl.³ .............................................. B60P 3/10
[52] U.S. Cl. .................................. 414/471; 280/80 R; 280/661; 280/414.1; 414/483; 414/494; 414/495; 414/529
[58] Field of Search ............... 414/483, 494, 495, 529, 414/460, 461; 280/80 R, 414 R, 414 B, 661

[56] References Cited

U.S. PATENT DOCUMENTS

| | | | |
|---|---|---|---|
| 2,509,067 | 5/1950 | Leach | 414/460 |
| 2,795,432 | 6/1957 | Martt | 280/414 R |
| 4,029,227 | 6/1977 | Martinez | 414/461 |

FOREIGN PATENT DOCUMENTS 1116946  11/1965  United Kingdom ............ 280/414 R Primary Examiner—Robert G. Sheridan
Attorney, Agent, or Firm—Barnes, Kisselle, Raisch & Choate

[57] ABSTRACT

The trailer has a main frame of generally U shape having stub axles on which ground-engaging wheels are journalled. A structurally rigid boat supporting frame is suspended from the main frame by a cable and pulley arrangement which enables the boat supporting frame to be raised and lowered horizontally and to be tilted lengthwise to a relatively steep angle relative to the main frame. The desired degree of tilt is facilitated by the fact that the front end of the boat supporting frame can be pivotally connected to the main frame at various heights.

12 Claims, 10 Drawing Figures

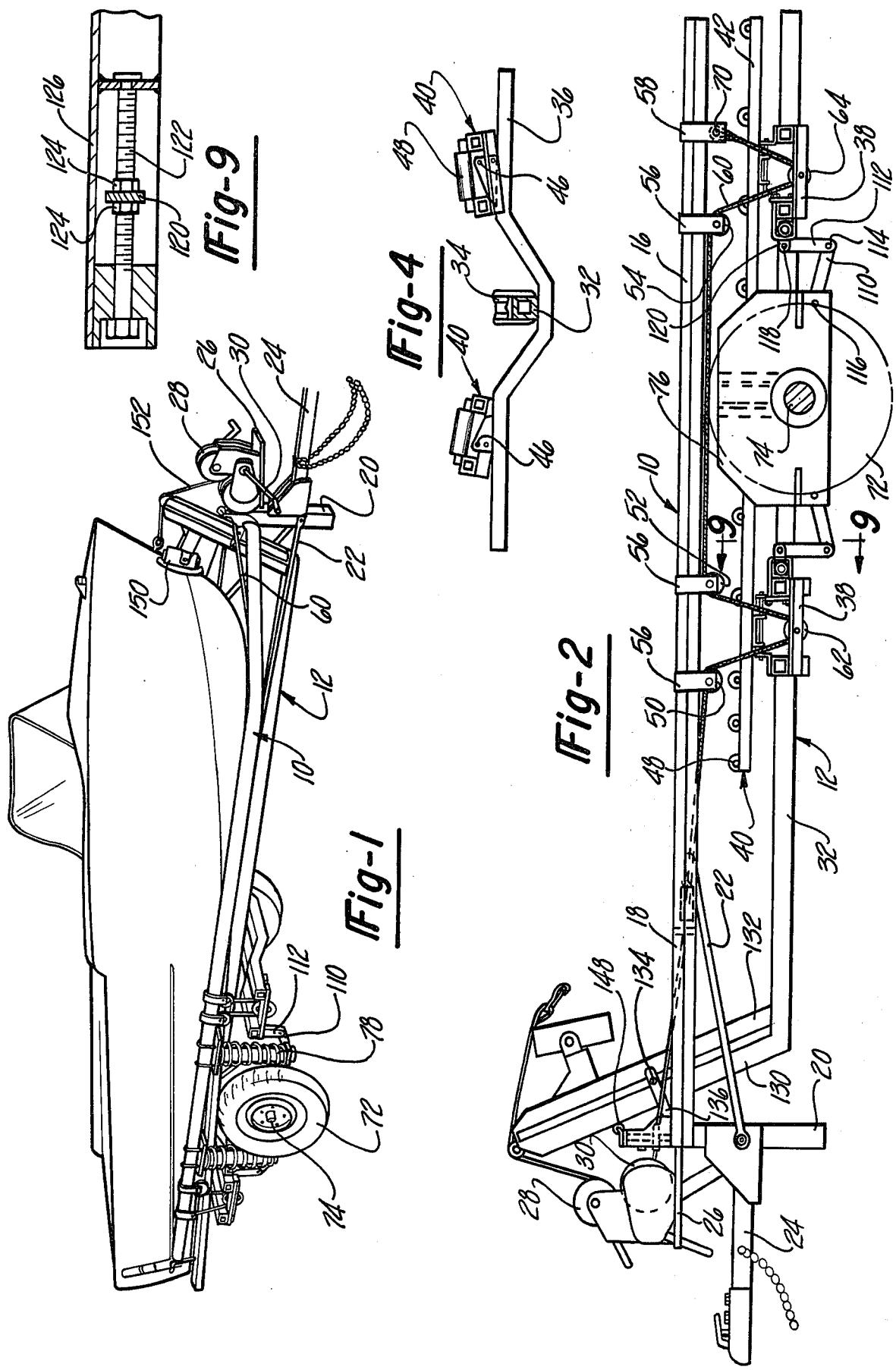

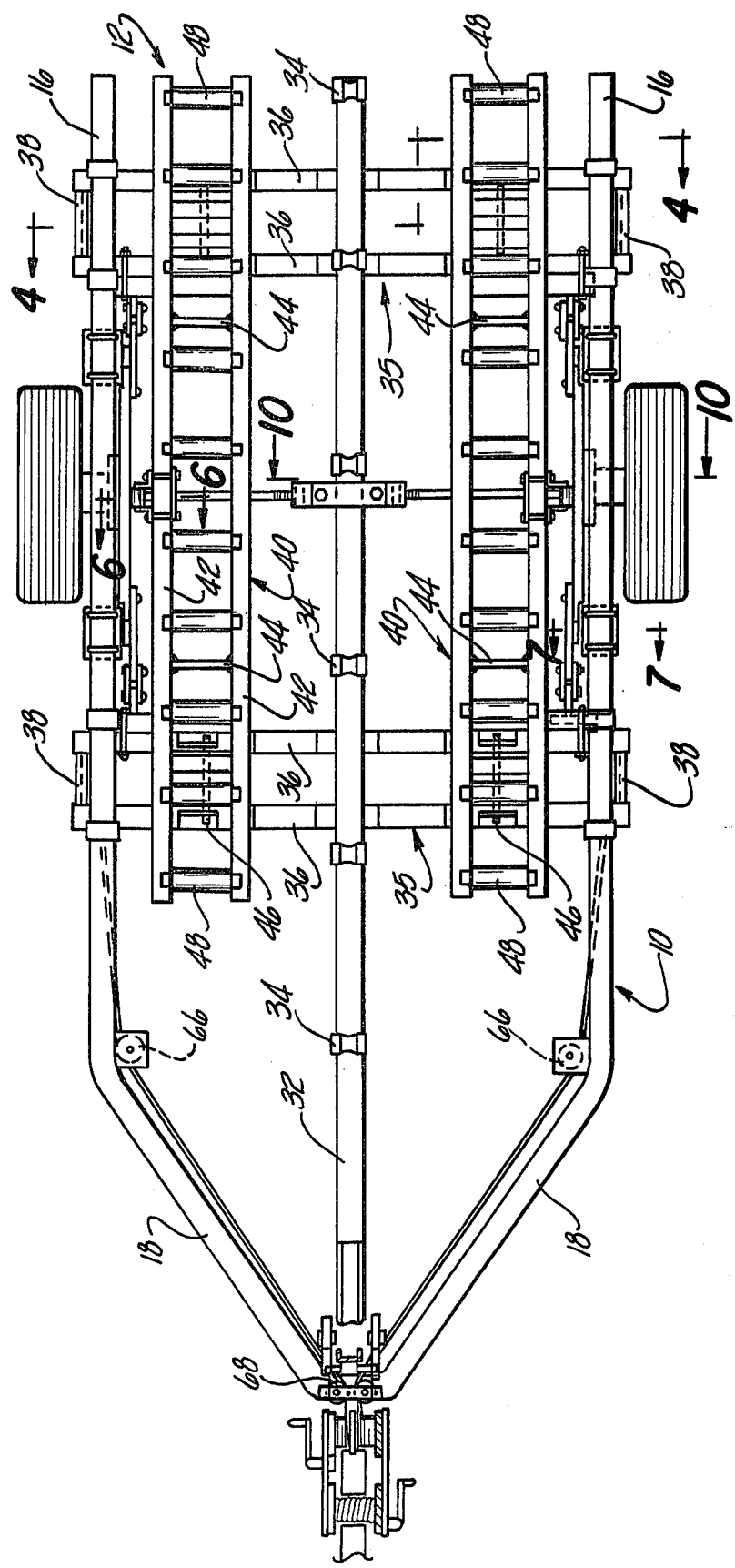

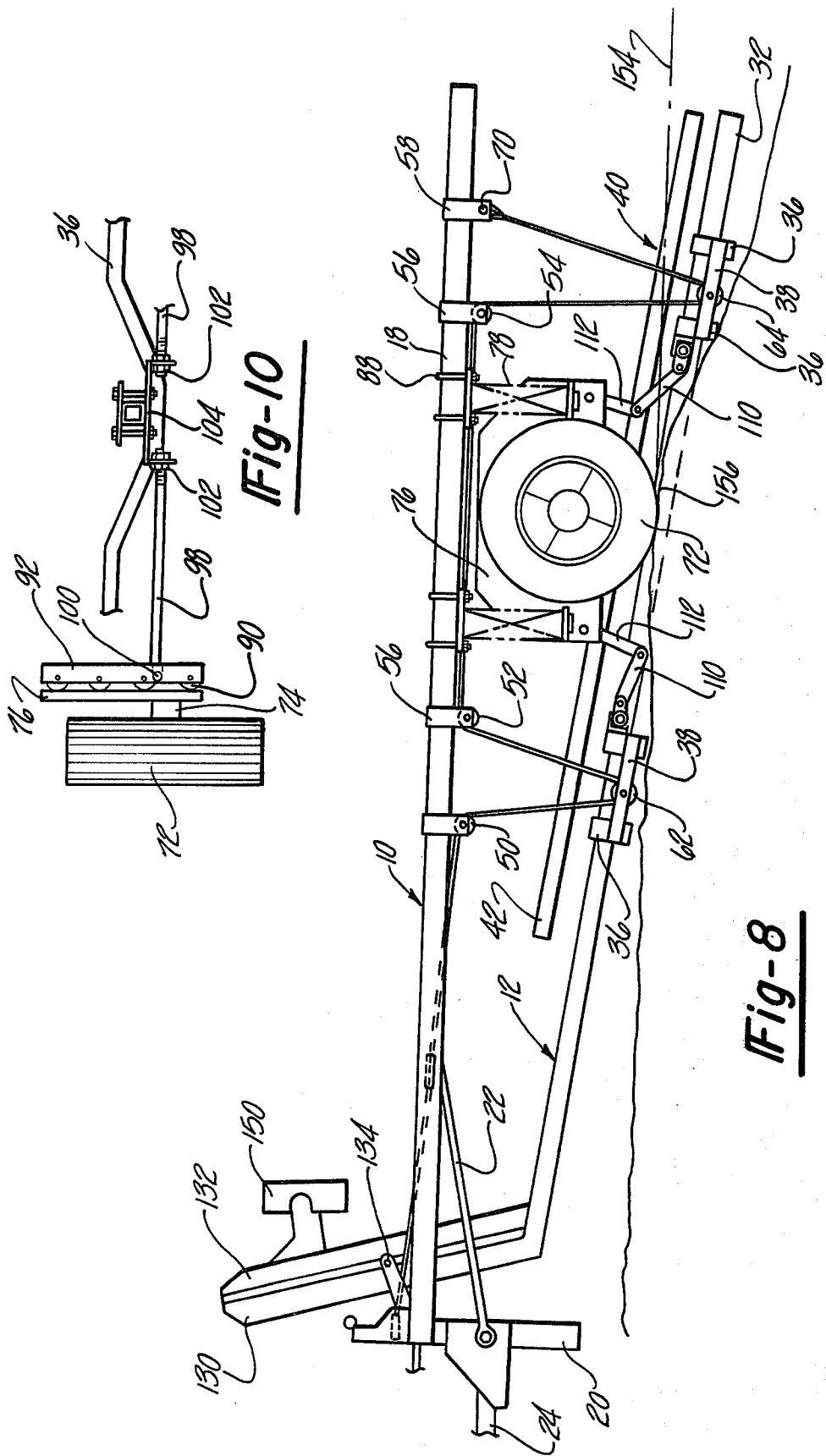

BOAT TRAILER

This invention relates to a trailer designed for transporting and launching a boat.

Boat trailers of various designs have heretofore been proposed which are adapted for launching and loading boats. For the most part such trailers are not adapted for easily launching or loading a boat in shallow water unless the trailer itself is backed into the water for a considerable distance. Likewise, most such trailers are not suited for launching or loading a boat over a steep embankment. With most trailers this problem arises because the trailer wheels are mounted on an axle which extends transversely across the entire trailer which prevents the boat supporting structure from being lowered horizontally between the wheels and which also limits the extent to which the boat supporting structure can be tilted lengthwise.

It has been proposed heretofore to provide a trailer that does not utilize a transversely extending axle. While such trailers enable the boat to be lowered to ground level between the wheels of the main frame, they involve inherent problems related to use and construction. The extent to which the boat can be tilted lengthwise relative to the main frame is severely limited and they are, therefore, unsuitable for launching or loading a boat over a relatively steep embankment. Such trailers also lack structural rigidity and road stability.

The present invention has for its object the provision of a boat trailer which simplifies launching a boat and loading the boat on a trailer under most any type of conditions encountered and which, at the same time, is of rigid construction and has very good road stability.

Other objects, features and advantages of the present invention will become apparent from the following description and accompanying drawings, in which:

FIG. 1 is a perspective view of a boat trailer according to the present invention having a boat loaded thereon;

FIG. 2 is a side elevational view of the boat trailer in the boat transporting position;

FIG. 3 is a top plan view of the boat trailer;

FIG. 4 is a sectional view along the line 4—4 in FIG. 3;

FIG. 8 is a side elevational view illustrating one manner in which the trailer may be arranged for loading or launching a boat;

FIG. 9 is a sectional view along the line 9—9 in FIG. 2; and

FIG. 10 is a sectional view along the line 10—10 in FIG. 3.

Figure 5:
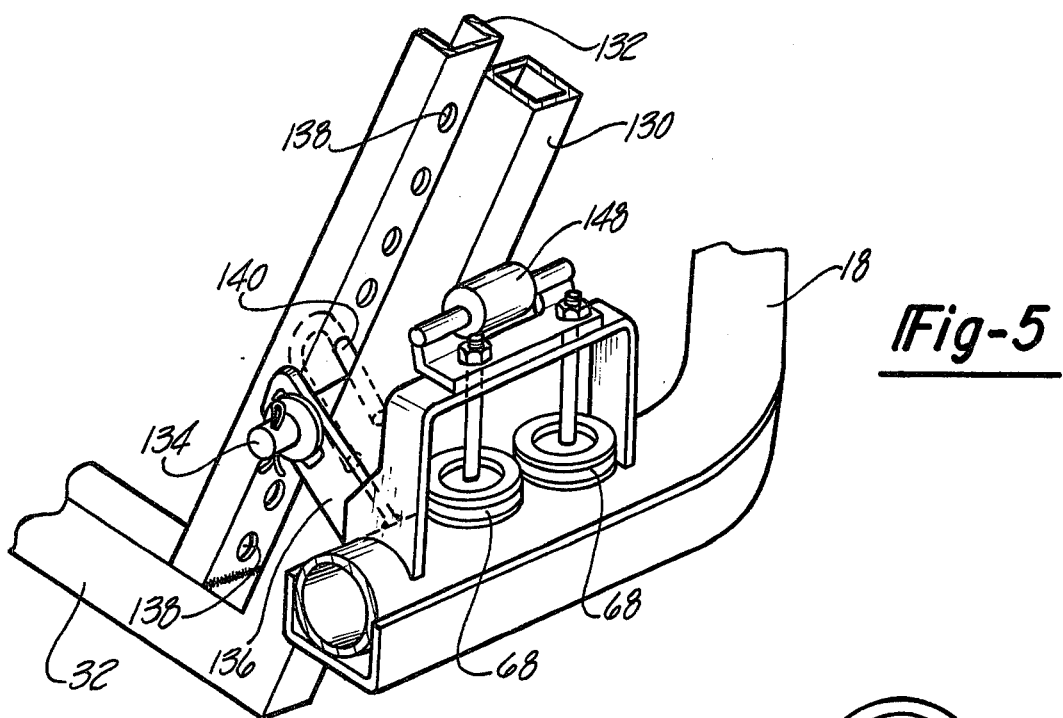
FIG. 5 is a fragmentary perspective view, partly in section, of the front end of the trailer.
Figure 6:
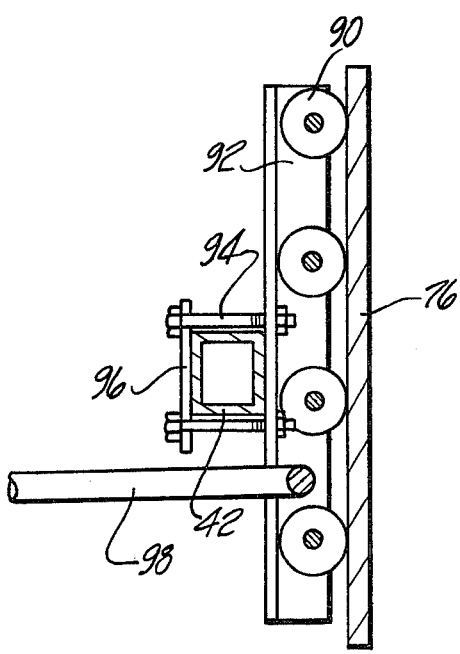
FIG. 6 is a sectional view along the line 6—6 in FIG. 3.

The boat trailer comprises a main frame 10 on which is suspended an auxiliary frame 12 for supporting a boat. As is shown in FIG. 3, the main frame 10 comprises a pair of reinforced tubular side members 16 which, at their forward ends, converge inwardly toward each other as at 18 so that the frame 10 is of generally U shape in a horizontal plane. At its forward end frame 10 has an upright stanchion 20 with reinforcing struts 22. A trailer hitch tongue 24 is mounted and extends forwardly from stanchion 20. A plate 26 fixedly mounted at the front end of frame 10 supports a pair of winches 28,30.

The auxiliary or boat supporting frame 12 comprises a main center beam 32 having a plurality of guide rollers 34 thereon for guiding and supporting the keel of the boat. Two longitudinally spaced transverse frames 35 are mounted on center beam 32. Each frame 35 comprises a pair of transverse beams or struts 36 fixedly mounted on center beam 32. The struts in each pair are spaced longitudinally apart as shown in FIGS. 2 and 3. Each of the transverse struts 36 is fixedly mounted at its center on beam 32 as by welding. The outer ends of the struts in each pair are interconnected by angle iron brackets 38 (FIG. 2). On opposite sides of the center beam 32 there is supported on frames 35 longitudinally extending frames 40 for engaging and supporting the bottom of the boat at each side of the keel. Each frame 40 consists of a pair of longitudinally extending and transversely spaced rails 42 which are rigidly interconnected by brackets 44. Frames 40 are mounted for pivotal movement on cross bars 36 as by pintles 46. On each frame 40 there is journalled a series of longitudinally spaced rollers 48. Frames 40 are thus capable of tilting about axes extending longitudinally of the trailer so that the rollers 48 will conform to and engage the bottom portions of the boat which incline upwardly and outwardly from the boat keel.

The cable-pulley arrangement for suspending the auxiliary or boat supporting frame 12 from the main frame 10 includes three pulleys 50,52,54 spaced longitudinally along each of the side members 16 on main frame 10. These pulleys are supported in a depending manner from the side member 16 by brackets 56. A fourth bracket 58 adjacent the rear end of each side member 16 serves as an anchor for the rear end of each cable 60. At each side of the boat supporting frame 12 there is arranged a front pulley 62 and a rear pulley 64. These pulleys are journalled on the brackets 38 which interconnect the cross struts 36. The pulleys 62 are located generally medially between the two front brackets 56 at each side of the main frame 10 and the pulleys 64 are located generally between the brackets 56,58 adjacent the rear end of the main frame 10. Additional guide pulleys 66 are mounted on the main frame 10 at the junctions of the side members 16 with the converging portions 18 and a further pair of guide pulleys 68 is mounted at the front end of the main frame directly adjacent the winch 30. Each of the cables 60 extend rearwardly from winch 30 around guide pulleys 68 and guide pulleys 60. The cables then extend downwardly around pulleys 50, upwardly around pulleys 62, then rearwardly over pulleys 52, downwardly around pulleys 54, upwardly around pulleys 64 and the rear ends of the cables are anchored on brackets 58 as at 70. With the above described pulley-cable arrangement it will be observed that the boat supporting frame 12 can be raised and lowered while generally horizontally disposed relative to the main frame 10 by operating the winch 30 so as to reel the cables 60 in or out. In addition, it will be observed that, without operating winch 30, the boat supporting frame 12 can be rocked or tilted lengthwise to various degrees of inclination relative to frame 10.

Figure 7:
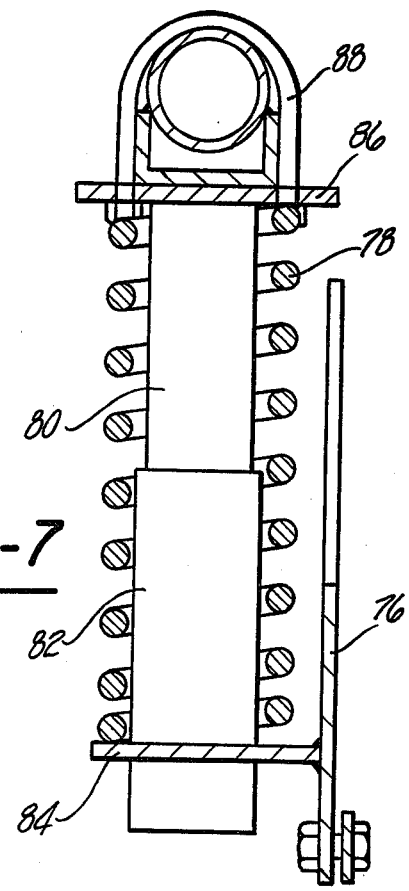
FIG. 7 is a sectional view along the line 7—7 in FIG. 3.

The ground-engaging wheels 72 for the trailer are mounted on stub axles 74 which are fixed to and extend outwardly from a pair of side plates 76. Each side plate 76 is supported by one of the side members 16 of main frame 10 by a pair of compression springs which surround telescoping guide tubes 80,82 (FIG. 7). Adjacent the front and rear ends of plates 76 there are mounted support brackets 84 on which the lower guide tubes 82 are fixedly supported. The lower ends of springs 78 bottom on these support brackets. The upper guide tubes 80 are mounted on a support plate 86 which is clamped to the underside of each side member 16 by U-bolts 88.

Side plates 76 not only provide a means for mounting the ground-engaging wheels on the main frame, but also a means for providing lateral stability of the boat supporting frame 12 relative to the main frame 10. This is accomplished by a series of vertically spaced rollers 90 on the boat supporting frame 12 which are arranged to engage the smooth inner faces of the two side plates 76. Rollers 90 are journalled between vertically extending brackets 92 which in turn are clamped intermediate their ends to the laterally outer rails 42 of frames 40 by means of bolts 94 and brackets 96. However, before the bolts 94 are tightened, the desired vertical inclination of brackets 92 is obtained by adjusting the length of the tie rods 98. As shown in FIG. 10, each tie rod 98 is pivotally connected at its outer end to brackets 92 as at 100. The inner end of each tie rod is threaded and adjustably connected by nuts 102 to a bracket 104 clamped to the center beam 32 of the boat supporting frame 12. By adjusting the effective length of tie rods 98 and then rigidly clamping brackets 92 to the frame members 42, the side plates 76 can be vertically inclined as desired to impart the desired camber to the wheels 74. This slight adjustment is accommodated by the U-bolts 88 which connect the side plate suspension to the side members 16 of the main frame.

The inner cross beams 36 of frames 45 which are located one ahead and one behind each side plate 46 are connected to the front and rear portions of side plates 46 by two pairs of links 110,112. These links are interconnected as at 114. The other end of each link 110 is pivotally connected to side plate 76 as at 116. The end of the other generally vertically extending link 112 is pivotally connected as at 118 to a bracket 120. As shown in FIG. 9, each bracket 120 is supported on a threaded shaft 122 and is adapted to be adjusted lengthwise of shaft 122 to a desired location by means of clamping nuts 124. Each shaft 122 is mounted within a housing 126. The housings 126 are clamped to the outer end portions of the two inner cross beams 36. Brackets 120 can be adjusted lengthwise of shaft 122 for the purpose of aligning side plates 76 in a longitudinal direction. These side plates are preferably adjusted so that the axes of the stub axles 74 are accurately perpendicular to the longitudinal axis of the trailer.

At its forward end the center beam 32 of the boat supporting frame 12 has a pair of forwardly inclined and longitudinally spaced structural members 130,132 fixedly mounted thereon. Member 130 is of tubular construction and of reactangular cross section while member 132 is a channel shaped member. These two members are spaced apart in parallel relation to accommodate therebetween a pin 134 (FIG. 5) supported by a pair of ears 136 welded to the front end of the main frame 10, one at each side of the members 130,132. The members 130,132 have a plurality of regularly spaced registering openings 138 therein. The spacing between the openings 138 in the two members is such as to accommodate the legs of a U clip 140 which is adapted to straddle pin 134. The arrangement is such that the members 130,132 are shiftable vertically relative to pin 134 and the pivotal connection therebetween can be secured at any desired height by inserting the U clip 140 through the registering openings 138 above and below pin 134.

In FIGS. 1 and 2 the trailer is shown with the auxiliary frame 12 arranged for transporting a boat. It will be observed that when so arranged the center beam 32 extends horizontally and is spaced above the road surface a distance only sufficient to provide the necessary clearance between the road surface and the auxiliary frame 12. In this condition the boat rests on rollers 48 and the center beam 32 is supported in a position relatively close to the ground surface. The auxiliary frame 12 is fixed to the main frame 10 in a fore and aft direction by pin 134 and clip 140 and by the interengagement of guide roller 148 (FIG. 5) with the front face of member 130. This also prevents the auxiliary frame 12 from tilting relative to the main frame since the effective length of the two cables 60 is fixed in this condition. The auxiliary frame 12 is also very stable in a lateral direction relative to the main frame 10 because the fixedly positioned and vertically arranged guide rollers 90 engage the inner faces of side plates 76 throughout a relatively large vertical extent of the side plates. Side plates 76 are also laterally stabilized by the links 110,112. Therefore, when the boat is supported on the trailer in the manner illustrated in FIG. 1 and secured against the forward stop 150 by tightening cable 152 on winch 28, the entire assembly provides a very rigid and stable construction for transporting the boat to and from the launching site. Additional tie-down straps may be used, if desired, for securing the boat on frame 12.

When it is desired to launch the boat into shallow water the trailer may be backed to the shoreline with its wheels at the water's edge and the auxiliary frame 12 lowered horizontally to the ground surface. This is accomplished by removing clip 140 and operating winch 130 so as to extend each cable 60. When the auxiliary frame 12 is resting generally horizontally on the ground with its rear end in the water the boat can be readily rolled off the auxiliary frame and into the water. The boat can be loaded onto the trailer from shallow water in the same manner.

In FIG. 8 the trailer is shown for launching a boat or loading a boat on the trailer where the ground is relatively soft and the water is not very shallow directly adjacent the shoreline. In this figure the water level is designated 154 and the shoreline is designated 156. Under the condition shown in FIG. 8 the auxiliary frame 12 can remain pivotally connected to the main frame at substantially the same height as in the transporting condition shown in FIG. 2. When the winch 30 is operated to release cable, the auxiliary frame 12 will pivot downwardly about the pivot axis at pin 134. If the ground at the water's edge 156 is relatively soft, the weight of the boat will actually cause the center beam 32 to be depressed downwardly below ground level and the boat can be rolled off the trailer with ease.

In the event it is desired to launch a boat from the trailer over a relatively steep embankment where the water level may be one or two feet below the top of the embankment, clip 140 may be removed from engagement with pin 134 so that the auxiliary frame 12 can be rocked upwardly at its front end to re-engage the clip with the lowermost openings 138 on the two members 130,132. If the boat is equipped with a motor, the added weight at the rear end will have a natural tendency to tilt upwardly at its front end. Thereafter, when winch 30 is operated to extend the cables 60, the auxiliary frame 12 will be inclined to the horizontally extending main frame 10 at a substantially steeper angle than shown in FIG. 8. The operation of launching a boat over a steep embankment or loading the boat onto the trailer over a steep embankment is thus rendered relatively easy.

I claim:

1. A boat trailer comprising a main frame having a pair of horizontally extending and laterally spaced side members connected together at their forward ends, said side members each having a stub axle thereon on which a ground-engaging wheel is journalled, a boat supporting frame having a longitudinally extending center support beam and a pair of longitudinally spaced transverse support beams mounted on said center beam, said transverse beams being located one ahead and one behind the ground-engaging wheels, said main frame and said boat supporting frame having a plurality of pulleys at each side thereof journalled for rotation about horizontal axes, cables extending lengthwise of the trailer at each side thereof and trained around said pulleys, said cables having rear ends anchored to one of said frames and having their forward ends connected to a winch so that the cables can be reeled in and out to vary the effective length thereof between the anchored ends and said winch, said boat supporting frame being suspended from said main frame by said cables and pulleys such that the boat supporting frame can be tilted in an fore and aft direction relative to said main frame by raising and lowering the front or rear ends of the boat supporting frame, means for releasably pivotally connecting the front end of the boat supporting frame with the front end of the main frame so that, when said frames are so pivotally connected and the cable means are reeled out, the boat supporting frame tilts downwardly about its front end as an axis and, when said frames are pivotally unconnected and the cable means are reeled out, the boat supporting frame can be lowered to ground level relative to the main frame, said main frame being unobstructed between said side members to permit the front end of the boat frame and the boat supported thereon to tilt upwardly on said main frame to at least about the level of the front end of the main frame and to permit the rear end of the boat frame and the boat supported thereon to tilt downwardly on the main frame to a level below the ground on which the wheels are supported.

2. A boat trailer as called for in claim 1 wherein the side members of the main frame have vertically extending guides thereon, said boat frame having guide members thereon engaging the guides on the main frame to prevent substantial lateral movement of the boat supporting frame relative to the main frame.

3. A boat trailer as called for in claim 1 including vertically extending side plates adjacent each side of the main frame, means resiliently mounting said side plates on the main frame, said stub axles being supported on said side plates.

4. A boat trailer as called for in claim 3 wherein said side plates have flat laterally inner faces which extend vertically, said boat supporting frame having at each side thereof a plurality of vertically spaced rollers engaging said inner faces of the side plates to guide the boat supporting frame vertically on the main frame between said side plates.

5. A boat trailer as called for in claim 4 including vertically extending brackets fixedly mounted on the boat supporting frame and movable therewith, said rollers being journalled on said brackets.

6. A boat trailer as called for in claim 3 including a plurality of link means pivotally interconnecting the boat supporting frame at each side thereof with said side plates, said link means permitting the boat frame to tilt and to shift longitudinally relative to said main frame.

7. A boat trailer as called for in claim 6 wherein each link means comprises a pair of links pivotally connected together at their adjacent ends for movement in a generally vertical plane, the other end of one link being pivotally connected with said boat supporting frame and the other end of the other link being pivotally connected with said side plate.

8. A boat trailer as called for in claim 7 wherein each side plate is connected with the boat supporting frame by two pairs of said links, one pair ahead and one pair behind the stub axle.

9. A boat trailer as called for in claim 8 wherein the pivotal connection between said one link in each pair with the boat supporting frame is adjustable in a direction transversely of the trailer to maintain the plane of said wheels in parallel relation with the longitudinal central axis of the trailer.

10. A boat trailer as called for in claim 4 including means for varying the inclination of said rollers to the vertical for adjusting the vertical inclination of said wheels.

11. A boat trailer as called for in claim 1 wherein said releasable pivotal connection between the main frame and the boat supporting frame is adjustable vertically to vary the relative vertical spacing between the front ends of the main frame and the boat supporting frame.

12. A boat trailer as called for in claim 1 wherein the boat supporting frame has a generally upright member mounted thereon adjacent its front end, said releasable pivotal connection means comprising means for pivotally interconnecting said upright member and said main frame at vertically spaced points along said upright member.

* * * * *